United States Patent
Moore et al.

(10) Patent No.: US 12,423,963 B2
(45) Date of Patent: Sep. 23, 2025

(54) MACHINE LEARNING AND DATA CLASSIFICATION FOR OPERATING A DEVICE SUCH AS A VEHICLE

(71) Applicants: Ford Global Technologies, LLC, Dearborn, MI (US); The Regents of the University of Michigan, Ann Arbor, MI (US)

(72) Inventors: John Moore, Canton, MI (US); Subhadip Ghosh, Rochester Hills, MI (US); Ziwei Zeng, Canton, MI (US); Junho Hong, Ann Arbor, MI (US); Jaerock Kwon, Ann Arbor, MI (US); Aydin Zaboli, Ann Arbor, MI (US); Kuchan Park, Ann Arbor, MI (US)

(73) Assignees: Ford Global Technologies, LLC, Dearborn, MI (US); The Regents of the University of Michigan, Ann Arbor, MI (US)

( * ) Notice: Subject to any disclaimer, the term of this patent is extended or adjusted under 35 U.S.C. 154(b) by 305 days.

(21) Appl. No.: 18/359,968

(22) Filed: Jul. 27, 2023

(65) Prior Publication Data
US 2025/0037438 A1    Jan. 30, 2025

(51) Int. Cl.
*G06V 10/82* (2022.01)
*B60W 60/00* (2020.01)
(Continued)

(52) U.S. Cl.
CPC ......... *G06V 10/776* (2022.01); *B60W 60/001* (2020.02); *G06T 7/11* (2017.01); *G06V 10/82* (2022.01); *G06V 20/58* (2022.01); *G06V 20/70* (2022.01); *B60W 2050/0018* (2013.01); *B60W 2420/403* (2013.01); *B60W 2554/4029* (2020.02); *B60W 2554/4044* (2020.02);
(Continued)

(58) Field of Classification Search
None
See application file for complete search history.

(56) References Cited

U.S. PATENT DOCUMENTS 10,528,054 B2    1/2020    Zou
10,902,302 B2    1/2021    Fu et al.
(Continued)

FOREIGN PATENT DOCUMENTS

| EP | 3796221 A1 * | 3/2021 | ........... G06V 10/776 |
|----|--------------|--------|------------------------|
| EP | 4030408 A1 * | 7/2022 | ............. G08G 1/166 |
| IN | 394582 B     | 8/2021 |                        |

*Primary Examiner* — Bernard Krasnic
(74) *Attorney, Agent, or Firm* — Christopher Storms; Brooks Kushman P.C.

(57) ABSTRACT

A computer that includes a processor and a memory, the memory including instructions executable by the processor to input an image to a first neural network to generate a first detected object and input the image to a second neural network to generate a reconstructed image which is input to a third neural network to generate a second detected object. The image can be divided into portions and the portions input to respective fourth neural networks to generate portions of a third detected object. The first detected object, the second detected object, the portions of the third detected object, and context data can be input to a partially observable Markov decision process to generate a high confidence detected object.

16 Claims, 7 Drawing Sheets

(51) Int. Cl.
   *G06T 7/11*      (2017.01)
   *G06V 10/776*    (2022.01)
   *G06V 20/58*     (2022.01)
   *G06V 20/70*     (2022.01)
   *B60W 50/00*     (2006.01)

(52) U.S. Cl.
   CPC .............. *G06T 2207/20021* (2013.01); *G06T 2207/20081* (2013.01); *G06T 2207/20084* (2013.01); *G06T 2207/30252* (2013.01)

(56) References Cited

U.S. PATENT DOCUMENTS

| | | |
|---|---|---|
| 11,205,251 B2 | 12/2021 | Lai et al. |
| 2021/0158540 A1* | 5/2021 | Hibi ................ G06V 10/82 |
| 2021/0287128 A1 | 9/2021 | Han et al. |
| 2023/0005360 A1* | 1/2023 | Zhou ................ G06N 20/20 |
| 2023/0365209 A1* | 11/2023 | Yang ................ B62D 59/04 |

\* cited by examiner

MACHINE LEARNING AND DATA CLASSIFICATION FOR OPERATING A DEVICE SUCH AS A VEHICLE

BACKGROUND

Computers can operate systems and/or devices including vehicles, robots, drones, and/or object tracking systems. Data including images can be acquired by sensors and processed using a computer to determine a location of a system with respect to objects in an environment around the system. The computer can use the location data to determine trajectories for moving a system in the environment. The computer can then determine control data to transmit to system components to control system components to move the system according to the determined trajectories.

DETAILED DESCRIPTION

Sensing systems including vehicles, robots, drones, etc., can be operated by acquiring sensor data regarding an environment around the system and processing the sensor data to determine a path upon which to operate the system or portions of the system. The sensor data can be processed to determine locations of objects in an environment. The objects can include roadways, buildings, conveyors, vehicles, pedestrians, manufactured parts, etc. The detected object can be used by a computer included in the system to operate the system. For example, a robot can use data regarding a detected object to determine a path for a gripper to pick an object up. A vehicle or drone can use data regarding detected objects to determine a path for operating the vehicle or drone based on locating and identifying an object in an environment around the vehicle or drone.

A vehicle is used herein as a non-limiting example of a system including a sensing sub-system. A computing device included in a vehicle can acquire sensor data including video, lidar, radar, and ultrasound data. The sensor data can be processed by the computer locate and identify objects in an environment around the vehicle. For example, a vehicle can acquire video sensor data as images and process the images to determine data regarding traffic signs. The traffic signs can include data regarding the operation of the vehicle such as stop signs, speed limit signs, do not enter signs and curve arrows, etc. A vehicle can also acquire video sensor data regarding objects in the environment such as pedestrians, bicycles, animals, and other vehicles.

Vehicle sensors such as a satellite-based global positioning system (GPS) and an accelerometer-based inertial measurement unit (IMU) can provide vehicle pose data that can be used to locate a vehicle with respect to an aerial image that includes location data in global coordinates. A vehicle can operate on a roadway based on a vehicle path by determining commands to direct the vehicle's powertrain, braking, and steering components to operate the vehicle so as to travel along the path. A vehicle path is typically a polynomial function upon which a vehicle can be operated. Sometimes referred to as a path polynomial the polynomial function can specify a vehicle location (e.g., according to x, y and z coordinates) and/or pose (e.g., roll, pitch, and yaw), over time. That is, the path polynomial can be a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

The polynomial function can be used to direct a vehicle from a current location indicated by vehicle sensors to another location in an environment around the vehicle while maintaining minimum and maximum limits on lateral and longitudinal accelerations. A vehicle can be operated along a vehicle path by transmitting commands to vehicle controllers to control vehicle propulsion, steering and brakes. A computing device in a vehicle can detect object locations and identities and use data regarding detected objects to determine a vehicle path. For example, detecting a stop sign could be used to determine a vehicle path that results in the vehicle stopping before reaching the stop sign. In another example, detecting a speed limit sign could be used to determine a vehicle's maximum speed.

Techniques described herein employ a two-step object detection system to enhance the ability of a computing device in a vehicle to detect objects accurately and reliably. Detecting objects in the context of this application includes determining a location and identity for objects in an environment around a vehicle. Machine learning systems can be dependent upon acquiring a clear and unblemished image of an object to be detected. Images of objects can be partially obscured by lighting, atmospheric phenomena such as fog or dust, by contaminants such as mud, snow, or ice, or other objects in the environment such as foliage or vehicles, for example. The first step of object detection techniques described herein use multi-path object detection to overcome partially obscured objects. Multi-path object detection uses more than one data paths to process a single data input. In this example, three data paths are used to process one input image using three different techniques before combining the results. The second step of object detection techniques described herein use context data in addition to first step object detection results input to a partially observable Markov decision process with memory to determine the most probable location and identity for an object.

A method is disclosed herein, including inputting an image to a first neural network to generate a first detected object, inputting the image to a second neural network to generate a reconstructed image which is input to a third neural network to generate a second detected object and dividing the image into portions and input the portions to respective fourth neural networks to generate portions of a third detected object. The first detected object, the second detected object, the portions of the third detected object, and context data can be input to a partially observable Markov decision process to generate a high confidence detected object. The first detected object, the second detected object, and the portions of the third detected object can be combined to determine a first object label and the first object label and context data is input to the partially observable Markov decision process. The first neural network, the third neural network, and the fourth neural networks can be convolutional neural networks. The second neural network can be a generative adversarial network that includes a decoder and a generator and is trained using a discriminator.

The partially observable Markov decision process can include states, actions, and transitions, wherein inputting the first detected object, the second detected object, the portions of the third detected object, and the context data causes one or more transitions from a first state to a second state. The partially observable Markov decision process can include a learning process which includes previous states, actions, and transitions. The high confidence detected object output by the partially observable Markov decision process can be based on previous decisions. The context data can include one or more of sensor data, map data and speed and direction of an object in an environment around a vehicle. The high confidence detected object can be used to determine a vehicle path. The vehicle path can be used to operate a vehicle. The learning process inputs the high confidence detected object, the first detected object, the second detected object, the portions of the third detected object, and context data and can update the partially observable Markov decision process. The partially observable Markov process can include rewards based on previous actions. The partially observable Markov process can include a discount factor that determines the number of time periods the reward will be summed over. The partially observable Markov process can include a conditional observation probability that includes a confidence value.

Further disclosed is a computer readable medium, storing program instructions for executing some or all of the above method steps. Further disclosed is a computer programmed for executing some or all of the above method steps, including a computer apparatus, programmed to input an image to a first neural network to generate a first detected object, input the image to a second neural network to generate a reconstructed image which is input to a third neural network to generate a second detected object and divide the image into portions and input the portions to respective fourth neural networks to generate portions of a third detected object. The first detected object, the second detected object, the portions of the third detected object, and context data can be input to a partially observable Markov decision process to generate a high confidence detected object. The first detected object, the second detected object, and the portions of the third detected object can be combined to determine a first object label and the first object label and context data is input to the partially observable Markov decision process. The first neural network, the third neural network, and the fourth neural networks can be convolutional neural networks. The second neural network can be a generative adversarial network that includes a decoder and a generator and is trained using a discriminator.

The instructions can include further instructions wherein the partially observable Markov decision process can include states, actions, and transitions, wherein inputting the first detected object, the second detected object, the portions of the third detected object, and the context data causes one or more transitions from a first state to a second state. The partially observable Markov decision process can include a learning process which includes previous states, actions, and transitions. The high confidence detected object output by the partially observable Markov decision process can be based on previous decisions. The context data can include one or more of sensor data, map data and speed and direction of an object in an environment around a vehicle. The high confidence detected object can be used to determine a vehicle path. The vehicle path can be used to operate a vehicle. The learning process inputs the high confidence detected object, the first detected object, the second detected object, the portions of the third detected object, and context data and can update the partially observable Markov decision process. The partially observable Markov process can include rewards based on previous actions. The partially observable Markov process can include a discount factor that determines the number of time periods the reward will be summed over. The partially observable Markov process can include a conditional observation probability that includes a confidence value.

Figure 1:
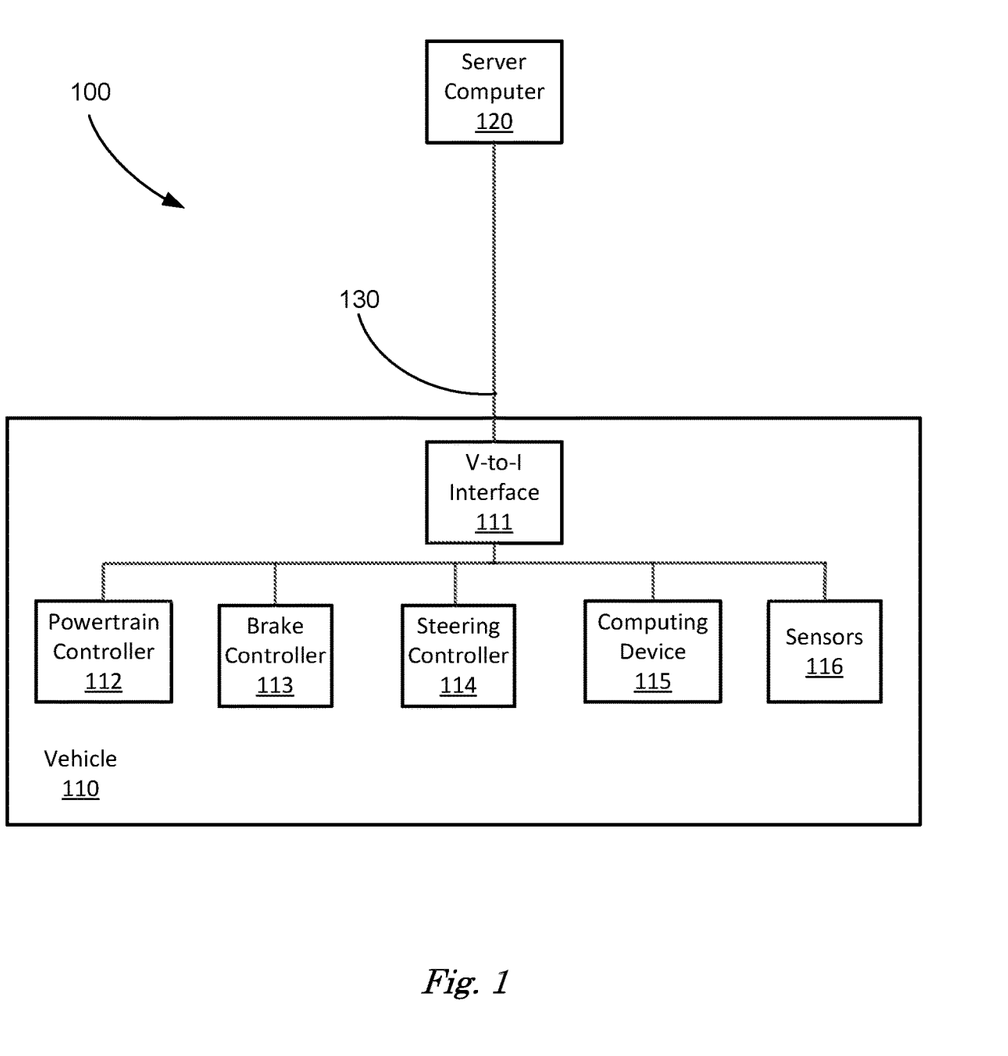
FIG. 1 is a block diagram of an example vehicle sensing system.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate the vehicle 110 based on data received from the sensors 116 and/or data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2X interface 111 and computing device 115, and therefore these features will not be described further. A server computer 120 can be used to develop and train software that can be transmitted to a computing device 115 in a vehicle 110.

Figure 2:
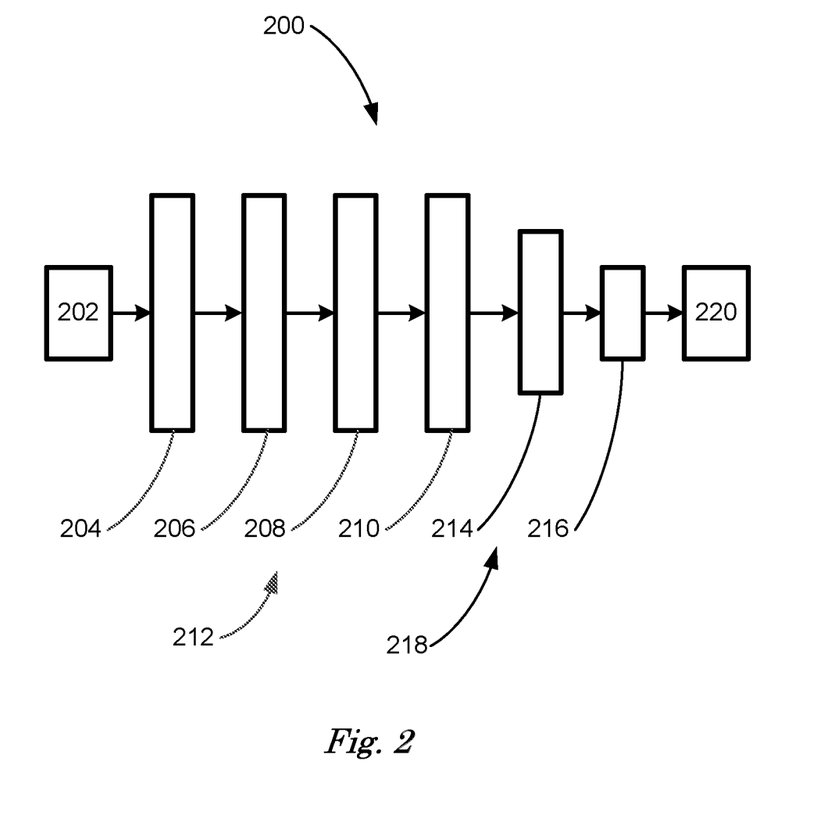
FIG. 2 is a diagram of an example convolutional neural network.

FIG. 2 is a diagram of an example convolutional neural network 200. Convolutional neural network 200 can input an image 202 and output a prediction 220. Convolutional neural network 200 include convolutional layers 204, 206, 208, 210, (collectively convolutional layers 212) and fully connected layers 214, 216 (collectively fully connected layers 218). Convolutional layers receive as input image data and convolve the image data using convolutional kernels which are typically k×k neighborhoods where k is a small number such as 3, 5, 7, 9, etc. The operation performed by the convolution kernel is determined by the numbers included in the k×k neighborhoods, called weights. Fully connected layers 218 calculate linear or nonlinear algebraic functions based on their input. They are referred to as fully connected because any input value can be combined with any other input value. The linear or nonlinear algebraic function determined by fully connected layers 218 is determined by parameters also called weights.

Convolutional neural networks 200 can be trained by compiling a training dataset that includes images 202 and ground truth data which indicates a user selected prediction 220 to be output from the convolutional neural network 200 in response to an input image 202. In this example, a prediction 220 includes object detection data, e.g. object locations in either global or pixel coordinates and an object label that identifies the object. Object labels can include "VEHICLE", "BICYCLE", "TRAFFIC SIGN", "PEDESTRIAN", and "ANIMAL", for example. Output from a neural network is referred to herein as a prediction. Ground truth is determined by a process separate from the neural network and can include human inspection and measurement of the image data and the scene that was imaged. Training the convolutional neural network 200 can include processing each image 202 in the training dataset hundreds or thousands of times, each time comparing the output prediction 220 to the ground truth to determine a loss function. The loss function is back propagated through the fully connected layers 218 and the convolutional layers 212 from back to front, altering the weights included in the fully connected layers 218 and convolutional layers 212 to minimize the loss function. When the loss function is sufficiently minimized, e.g., when changing the weights does not make the loss function smaller, the convolutional neural network 200 may be considered to be trained, and the current weights are saved.

The outputs from each convolutional layer 212 and each fully connected layer 218 to the next layer in the convolutional neural network 200 are called tensors. The tensor is output from a layer via an activation function that can condition the output. For example, ReLu activation conditions the output to be positive. Output from a convolutional layer 212 or fully connected layer 218 via an activation function is called an activation tensor herein. The activation tensors output by the layers 212, 218 of a trained convolutional neural network in response to a particular input image 202 can be used to characterize the convolutional neural network 200 and will be used herein to determine similarities between two or more convolutional neural networks, for example.

Figure 3:
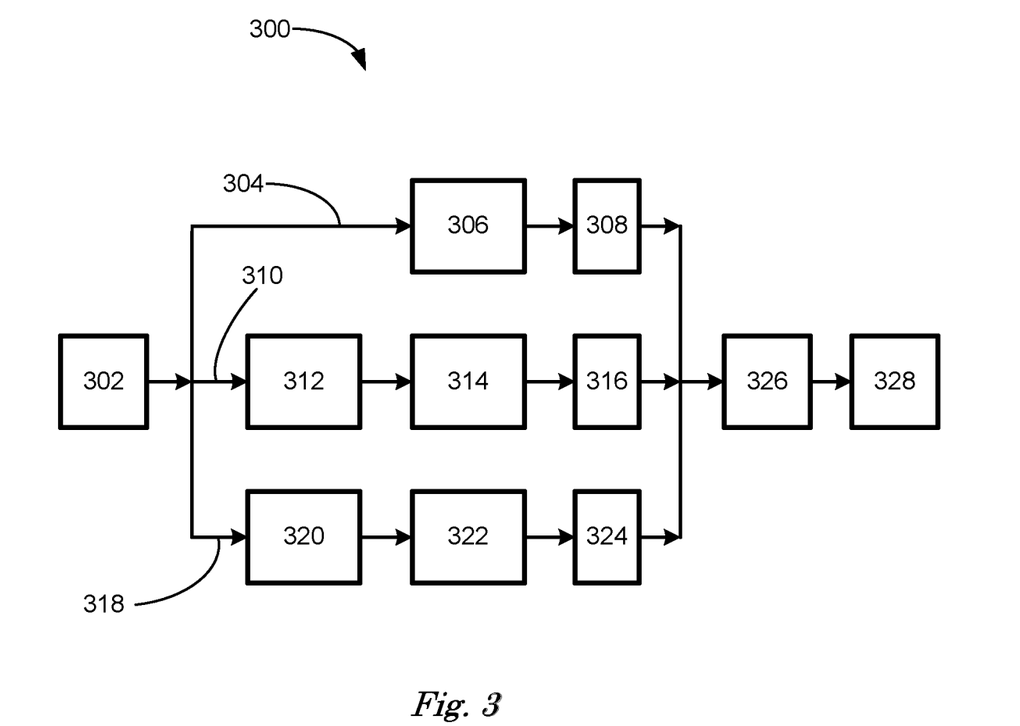
FIG. 3 is a diagram of an example multi-path object detection system.

FIG. 3 is a diagram of multi-path object detection system 300. Multi-path object detection system 300 can be a software program residing in memory and executed by computing device 115. Multi-path object detection system enhances the likelihood that an object will be correctly detected by inputting an image 302 that includes an object to three different data paths that process the input image 302 using three different techniques. The first data path 304 receives as input the image 302 to a first neural network 306. First neural network 306 can be a convolutional neural network 200, trained as described above in relation to FIG. 2 to detect objects in an image 302. First neural network 306 outputs a first prediction 308 that includes a location for the object in either real world coordinates or in pixel coordinates and an object label that identifies the object as discussed above. In examples where the label is "traffic sign", the prediction can include data regarding the type of traffic sign, for example "STOP" or "SPEED LIMIT 70 MPH." The first prediction 308 can also include a confidence value determined by first neural network 306 that estimates a probability that the label is correct.

As described above, an issue with detecting objects in an image 302 is that the image 302 can be acquired under less than ideal environmental conditions. For example, the image 302 can be acquired in dim or overcast lighting or in the presence of image "noise" such as rain, snow, fog, or dust. The second data path 310 included in multi-path object detection system 300 can include a generative adversarial network (GAN) 312. A GAN 312 is a neural network that includes a decoder that receives as input an image 302 and decodes the image 302 into latent variables. The latent variables are input to a generator that reconstructs an image from the latent variables while adding or subtracting image noise and simulating different lighting conditions. The GAN is trained by outputting the processing results to a discriminator, which is a neural network trained to determine a real image from a reconstructed image. The GAN 312 is considered trained when it can output a reconstructed image with simulated noise that fools the discriminator into classifying the image as real. At inference time the GAN 312 receives as input an image 302 and adds noise to the image and outputs a reconstructed image. A second neural network 314 has been trained to detect objects in noisy images. The second neural network 314 receives as input the reconstructed image from GAN 312 and outputs a second prediction 316.

Figure 5:
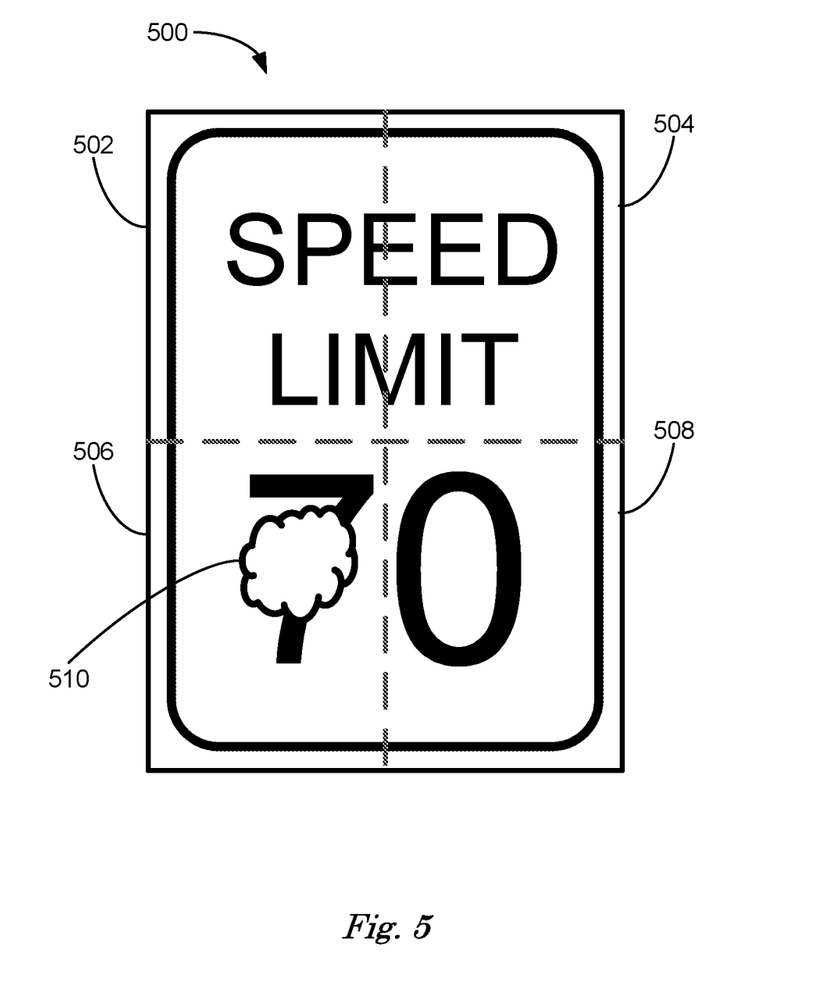
FIG. 5 is a diagram of an example object.

The third data path 318 includes an image pre-processor 320 that divides the image 302 into portions. The third data path 318 can process images 302 that are corrupted with a different type of noise than the second data path 310. The third data path 318 processes image 302 data that has been corrupted with local noise. For example, traffic sign can have mud or snow obscuring a portion of the sign. In other examples, a traffic sign can be tampered with to obscure portions of the sign. For example, FIG. 5 illustrates a traffic sign 500 segmented into four portions 502, 504, 506, 508. One of the portions 506 is partially obscured by a snowball that has been thrown at the sign. The third data path 318 works on the principle that in examples where a portion of an object is obscured by noise, dividing an image 302 into segments can permit a fourth neural network 322 to process the image segments separately. Processing the image segments separately can advantageously restrict ambiguous and/or low confidence results to the image segments that are obscured, while permitting non-obscured segments to return high confidence results.

In examples where the image segments are processed separately by fourth neural network 322, the non-obscured portions of an object will be processed with high confidence. The image segments are processed by fourth neural network 322 to determine multiple object predictions 324 that includes an object prediction for each segment, where each object prediction includes a confidence value. In examples where a portion of an image 302 is obscured, the object predictions 324 that include high confidence predictions can be combined to infer a prediction for portions of the image 302 that include a low confidence prediction. In the example of FIG. 5, high confidence predictions for segments 502, 504, 508 can be combined to infer that the image of a traffic sign 500 includes a speed limit sign despite a low confidence prediction for segment 506.

Predictions 308, 316, 324 from the three data paths 304, 310, 318 can be combined at combiner 326. Combiner 326 can include instructions to compare the predictions 308, 316, 324 to determine whether the predictions 308, 316, 324 agree. In this context, predictions 308, 316, 324 agree when they include a same object label at a same location. In examples where the atmospheric conditions are clear, lighting is good, and the object is not obscured, the three data paths 304, 310, 318 can all arrive at the same prediction 308, 316, 324 for the object location and object label. In examples where one or more of poor atmospheric conditions, dim lighting or object obscuring are present, one or more predictions 308, 316, 324 can have a low or indeterminant confidence value while one or more predictions 308, 316, 324 have a high confidence value. In examples, a low confidence value can be a less than 50% probability that a prediction 308, 316, 324 is correct and a high confidence value can be a greater than 90% probability that the prediction 308, 316, 324 is correct, for example. Confidence values between 50% and 90% can be indeterminant, in these examples.

In examples where all of the predictions 308, 316, 324 are in agreement and all of the agreed upon predictions 308, 316, 324 have high confidence values, combiner 326 can select the high confidence predictions as the result and the high confidence, agreed upon predictions 308, 316, 324 are output as predictions 328 and passed to a computing device 115 included in the vehicle 110 to be used for operating the vehicle. The predictions 328 can also be passed to active inference object detection system 400 to assist in training the active inference object detection system 400. In examples where the predictions 308, 316, 324 are not in agreement and/or one or more of the predictions 308, 316, 324 have low or indeterminant confidence values, the predictions 308, 316, 324 are output as predictions 328 and passed to an active inference object detection system 400 as described in relation to FIG. 4, below for further processing.

Figure 4:
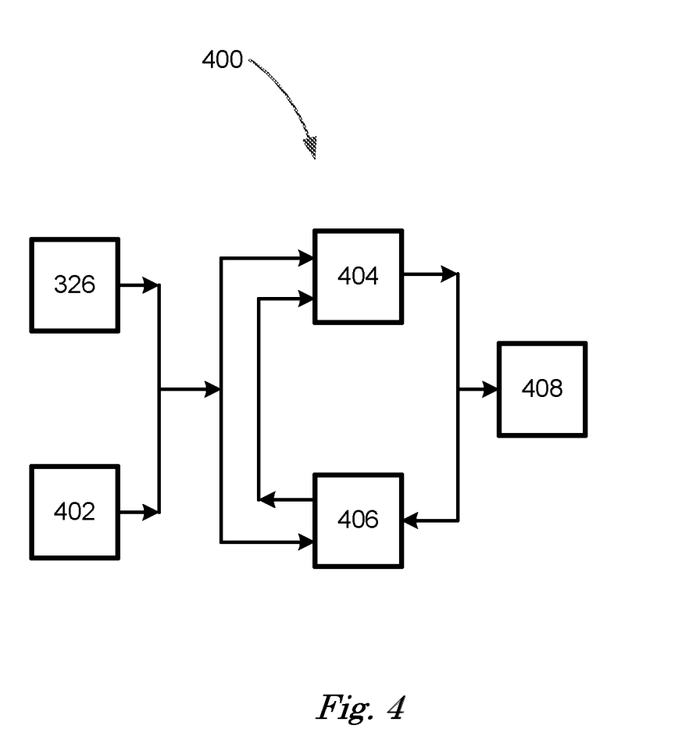
FIG. 4 is a diagram of an example active inference object detection system.

FIG. 4 is a diagram of an active inference object detection system 400. Active inference object detection system 400 can be a software program residing in memory and executed by computing device 115. Active inference object detection system 400 receives as input predictions 328 output by multi-path object detection system 300 and also receives as input context data 402. Predictions 328 include the predictions 308, 316, 324 and confidence values output by data paths 304, 310, 318. Context data 402 is data regarding the environment around a vehicle 110 determined by computing device 115 based on data acquired by sensors 116 and data transmitted to the computing device 115 from a remote server computer 120 via a network 130. The data acquired by sensors 116 can include GPS data regarding the real world location of the vehicle 110. The data acquired by sensors 116 can include data regarding objects included in the environment such as other vehicles, for example. The data regarding other vehicles can be processed using software programs such as neural networks to determine locations, speed, and directions of the other vehicles, for example. Context data 402 received from remote server computers 120 can include map data downloaded from a remote device, e.g., via the Internet. The map data can include data regarding roadways, including traffic signs, traffic signals, intersections, and crosswalks, for example.

Predictions 328 and context data 402 are input to a partially observable Markov decision process (POMDP) 404 and learning processor 406. Memory includes previous refined predictions 408 output by POMDP 404, previous predictions 328 including confidence values and context data 402. POMDP 404 receives as input the predictions 328 including confidence values, context data 402 and previous data from learning processor 406 and outputs a refined prediction 408 based on the input predictions 328. Active inference object detection system 400 can enhance the ability to detect objects by combining predictions 328 with context data 402 and previous refined predictions 408. Refined predictions 408 can include object locations and object labels along with confidence values for the object locations and object labels.

POMDP 404 is defined by a 7-tuple (S, A, T, R, Ω, O, γ), where S is a set of states, A is a set of actions, T is a set of conditional transition probabilities between states, R is a reward function that maps the sets of states S and actions A to a real number R, Ω is a set of observations. The states S are the elements that indicate the computation performed by POMDP 404. Each state s∈S can include variables and instructions that, upon receiving an input observation ω∈Ω, determine transformations to be applied to the variables, an action a∈A to be output as refined predictions 408, and a transition t∈T to a next state $s_{new}$. In some examples, the new state can be the same as the previous state. At any time period one and only one state s is active. In this example variables included in the states S can be object locations and labels, confidence values, and amount of context data 402 available. The set of observations Ω in this example include the predictions 328, and context data 402. In this example, the set of observations Ω also includes hidden observations, which are generated internally by the POMDP 404. O is a set of conditional observation probabilities, which in this example can be the confidence values included in the predictions 328. γ is a discount factor that can determine the number of time periods that the reward function will be summed over.

At each time period the POMDP 404 is in a state s∈S. At the current time period $t_0$ the POMDP 404 can receive observation ω∈Ω and the current conditional observation probabilities o∈O by inputting a prediction 328. Inputting the observation ω conditioned on the observation probability o causes the POMDP 404 to transition from a current state s to a new state $s_{new}$ and output an action a in the form of a refined prediction 408 to the computing device 115. The refined prediction 408 can be a new object location and label including new confidence values determined by the POMDP 404 based on the context data 402. The POMDP 404 can receive a reward $r_n$∈R at a time period $t_n$ based on computing device 115 evaluating the success of previous actions a. A reward r is a numerical value between 0 and 1 that determined by computing device 115 that indicates how useful the refined prediction 408 was in determining a vehicle path for the vehicle 110. The discount factor γ determines how many time periods the reward r is summed over, with a value of γ=0 meaning only the current reward r is considered and γ=1 meaning that all future rewards will be maximized. Intermediate values of γ will include rewards for intermediate time periods.

The POMDP 404 can output a refined prediction 408 that includes a high confidence object location and label even though the input predictions 328 can be missing, incorrect, or low confidence. For example, a prediction 328 input to a POMDP 404 can include three predictions 308, 316, 324 with three difference confidence values. A POMDP 404 can select between differing predictions 308, 316, 324 and determine a confidence value to output as a refined prediction 328 based on including the current context data 402 and previous predictions 328 and context data 402 input included in the updated POMDP 404 input from learning processor 406.

For example, traffic sign 500 from FIG. 5 can be input to multi-path object detection system 300. In an example, predictions 308, 316 can include low confidence object labels. Prediction 324 can include predictions for four segments where three of the segments have high confidence labels but the segment that can determine the speed limit value has low confidence. Context data 402 included in the input to the POMDP 404 can indicate that the roadway the vehicle 110 is currently traveling on a roadway with a 70 MPH speed limit. In this example, POMDP 404 can be in a state s that indicates a speed limit sign has been detected but the speed is indeterminant. Inputting context data 402 that includes data regarding the current roadway speed limit based on map data and GPS data can indicate outputting and action a that includes a refined prediction 408 that includes an object label equal to "70 MPH speed limit sign" with high confidence.

Previous predictions 328 and context data 402 input to POMDP 404 is used by learning processor 406 to update POMDP 404. Learning processor 406 receives as input current refined predictions 408, input predictions 328 and context data 402. Learning processor 406 updates the POMDP 404 based on current refined predictions 408 input predictions 426 and context data 402 along with previous refined predictions 408, previous predictions 328 and previous context data 402 stored in memory included in learning processor 406. In examples where incomplete or low confidence predictions 328 are input, the updated POMDP 404, can make correct refined prediction 408 based on previously determined refined predictions 408, and previously input predictions 328 and context data 402, that can have resulted in positive reward functions r.

A further example of context data 402 used to assist POMDP 404 can include an example where input predictions 328 indicate an object in the field of view of sensors 116 detected with low confidence. For example, context data 402 can indicate that the object is located in a crosswalk that can be occupied by pedestrians. Additional context data 402 can indicate that other vehicles in the environment are stopping at the crosswalk. POMDP 404 can output a refined prediction 408 that assumes that the detected object has a high probability of being a pedestrian based on being located in a crosswalk and other vehicles stopping. Further the refined prediction 408 along with the input predictions 328 and context data 402 is input to the learning processor 406 to update the POMDP 404 and enhance object detection based on incomplete or missing data.

FIG. 5 is a diagram of an image of a traffic sign 500. Traffic sign 500 is a speed limit sign and is segmented by image pre-processor 320 into four segments 502, 504, 506, 508. Segment 506, which includes the numeral "7" indicating, along with the numeral "0," that the speed limit is 70 miles per hour (MPH), is obscured, in this example by snow 510. An image of traffic sign 500, input to data paths one 304 and two 310 of multi-path object detection system 300 could output inconclusive or low confidence predictions 308, 316 regarding a label to attach to traffic sign 500. Data path three 318 can output high confidence predictions regarding segments 502, 504, 506 and a low confidence prediction regarding segment 506. Outputting the predictions 328 to active inference object detection system 400 along with context data 402 can enhance predictions included in refined prediction 408. For example, map data and vehicle location data included in context data 402 can indicate that the vehicle 110 is currently traveling in a 70 MPH speed zone, making it highly likely that the traffic sign 500 is a 70 MPH speed limit sign.

Figure 6:
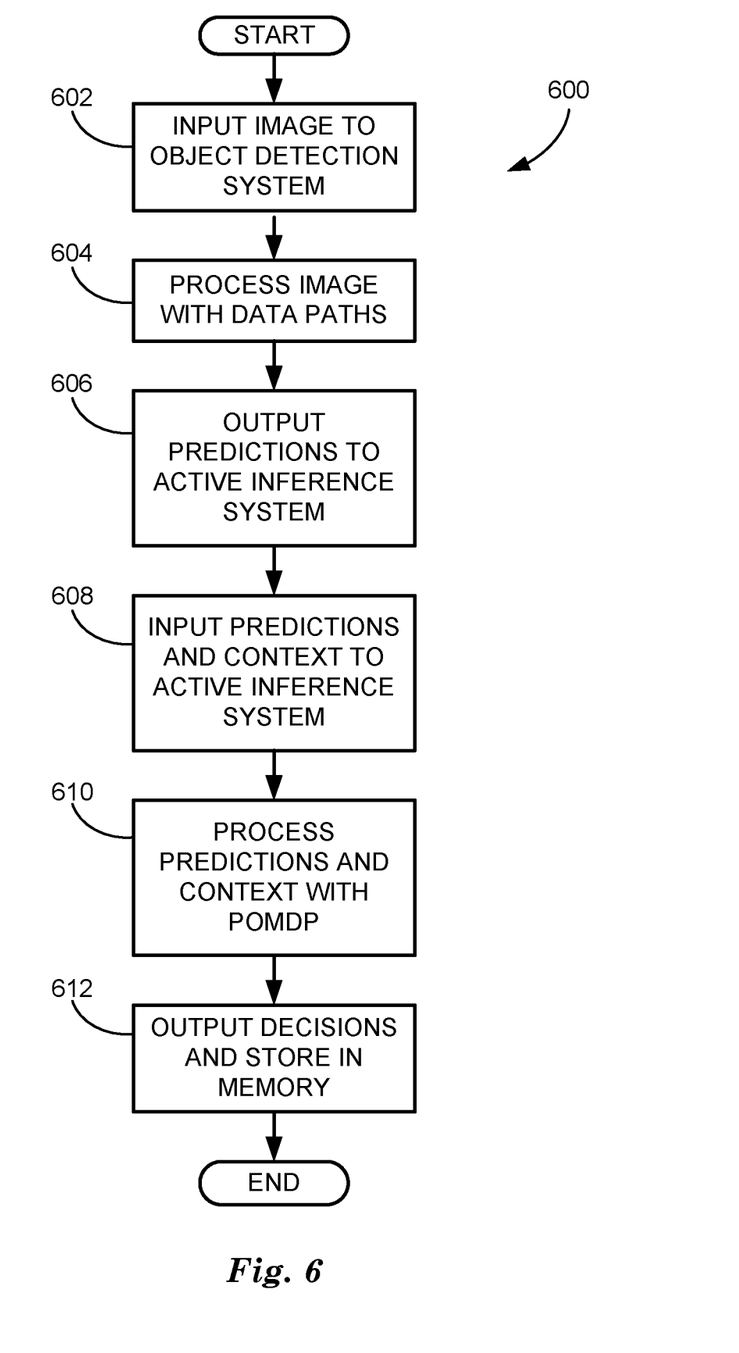
FIG. 6 is a flowchart diagram of an example active inference object detection system.

FIG. 6 is a flowchart of a process 600 for determining a refined prediction 408 that includes an object location and label indicated with high confidence based on vehicle sensor 116 data. Process 600 can be implemented in a computing device 115 included in a vehicle 110. Process 600 includes multiple blocks that can be executed in the illustrated order. Process 600 could alternatively or additionally include fewer blocks or can include the blocks executed in different orders.

Process 600 begins at block 602 where a computing device 115 in a vehicle 110 acquires an image 302 from a sensor 116, which can be a video camera included in the vehicle 110. The image 302 includes data regarding an environment around the vehicle 110. Image 302 can include an object, which, when detected, could assist the computing device 115 in directing the vehicle 110.

At block 604 computing device 115 receives as input the image 302 to a multi-path object detection system 300. Multi-path object detection system 300 include three data paths 304, 310, 318. The first data path 304 processes the image 302 with a first neural network 306 to determine first predictions 308 regarding the location and identity (label) of the object. The second data path 310 receives as input the image 302 to a GAN 312 which adds image noise to the image to simulate atmospheric and lighting conditions before processing the image 302 with a second neural network 314 to determine second predictions 316. The third data path 318 includes a segmentor which segments the image into multiple segments. The multiple segments are processed by a one or more third neural networks 322 which output multiple predictions 324. The first, second, and third predictions and confidence values are combined by predictions 328 as described above in relation to FIG. 3.

At block 606 the predictions 328 and confidence values are output to active inference object detection system 400. In examples where the predictions are in agreement and have high confidence, the inference object detection system 400 can be skipped and the object locations and labels can be output directly to computing device 115.

At block 608 the output predictions 328, confidence values, and context data 402 from computing device 115 are input to POMDP 404 in the active inference object detection system 400. The output predictions 328, confidence values, and context data 402 are also input to the learning processor 406 portion of the active inference object detection system 400.

At block 610 the output predictions 328, confidence values, context data 402 and data from learning processor 406 are processed by POMDP 404. The POMDP 404 receives as input the output predictions 328, confidence values, context data 402 and data from learning processor 406 and determines a refined prediction 408. The refined prediction 408 can include an updated prediction and confidence value regarding an object.

At block 612 active inference object detection system 400 outputs a refined prediction 408 including an object prediction and confidence value to computing device 115. The active inference object detection system 400 also stores the refined prediction 408 in learning processor 406 to assist in making future refined predictions 408. Following block 612 process 600 ends.

Figure 7:
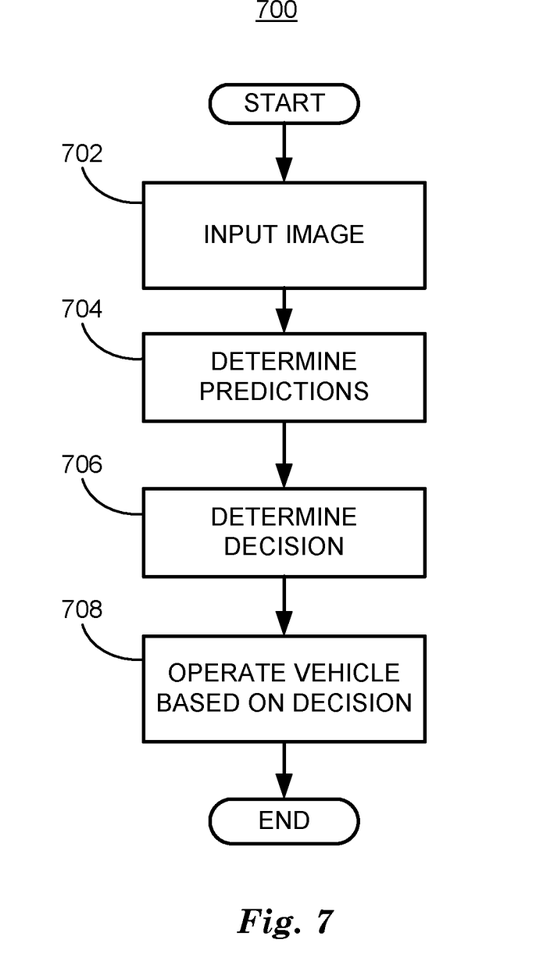
FIG. 7 is a flowchart diagram of an example process to operate a vehicle based on a two-level object detection system.

FIG. 7 is a flowchart of a process 700 for operating a vehicle 110 based on an object detected by multi-path object detections system 300 and active inference object detection system 400. Process 700 can be implemented by computing device 115 included in a vehicle 110. Process 700 includes multiple blocks that can be executed in the illustrated order. Process 700 could alternatively or additionally include fewer blocks or can include the blocks executed in different orders.

Process 700 begins at block 702, where a computing device 115 in a vehicle 110 acquires an image 302 from a sensor 116, which can be a video camera included in the vehicle 110. The image 302 includes data regarding an environment around the vehicle 110. Image 302 can include an object, which, when detected, could assist the computing device 115 in directing the vehicle 110.

At block 704 computing device 115 determines a prediction 326 by inputting the image 302 to a multi-path object detection system 300 as described above in relation to FIG. 3. The predictions can include a location, a label and a confidence value for an object included in the image 302.

At block 706 computing device 115 determines a refined prediction 408 by inputting the prediction 326 and context data 402 into an active inference object detection system 400 as described above in relation to FIG. 4.

At block 708 computing device 115 operates a vehicle 110 based on the refined prediction 408 output by active inference object detection system 400. For example, when the refined prediction 408 includes an object with the label "pedestrian", the vehicle path could include stopping if the location of the object was on the roadway. In other examples, when the refined predication 408 included an object with the label "animal", the vehicle path could include steering or slowing the vehicle. In examples where the refined prediction 408 included a traffic sign, the vehicle path (or trajectory, e.g., including speeds or velocities) could be determined according to traffic rules or information displayed on the traffic sign. Similarly, a vehicle path could be determined according to a prediction 408 concerning a road lane marking or the like. In general, the vehicle 110 can be operated by determining a vehicle path by determining a path polynomial function which maintains minimum and maximum limits on lateral and longitudinal accelerations. A vehicle 110 can be operated along a vehicle path by transmitting commands to controllers 112, 113, 114 to control vehicle propulsion, steering and brakes. Following block 708 process 700 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to:
input an image to a first neural network to generate a first detected object;
input the image to a second neural network to generate a reconstructed image which is input to a third neural network to generate a second detected object, wherein the first neural network, the third neural network, and fourth neural networks are convolutional neural networks, and the second neural network is a generative adversarial network;
divide the image into portions and input the portions to the respective fourth neural networks to generate portions of a third detected object; and
input the first detected object, the second detected object, the portions of the third detected object, and context data to a partially observable Markov decision process to generate a high confidence detected object, wherein the high confidence detected object is used to determine a vehicle path.

2. The system of claim 1, wherein the first detected object, the second detected object, and the portions of the third detected object are combined to determine a first object label and the first object label and context data is input to the partially observable Markov decision process.

3. The system of claim 1, wherein the second neural network includes a decoder and a generator and is trained using a discriminator.

4. The system of claim 1, wherein the partially observable Markov decision process includes states, actions, and transitions, wherein inputting the first detected object, the second detected object, the portions of the third detected object, and the context data causes one or more transitions from a first state to a second state.

5. The system of claim 4, wherein the partially observable Markov decision process includes a learning process which includes previous states, actions, and transitions.

6. The system of claim 5, wherein the high confidence detected object and a confidence value output by the partially observable Markov decision process is based on previous decisions.

7. The system of claim 1, wherein the context data includes one or more of sensor data, map data and speed and direction of an object in an environment around the system.

8. The system of claim 1, wherein the vehicle path is used to operate a vehicle.

9. A method, comprising:
inputting an image to a first neural network to generate a first detected object;
inputting the image to a second neural network to generate a reconstructed image which is input to a third neural network to generate a second detected object, wherein the first neural network, the third neural network, and fourth neural networks are convolutional neural networks, and the second neural network is a generative adversarial network;
dividing the image into portions and input the portions to the respective fourth neural networks to generate portions of a third detected object; and
inputting the first detected object, the second detected object, the portions of the third detected object, and context data to a partially observable Markov decision process to generate a high confidence detected object, wherein the high confidence detected object is used to determine a vehicle path.

10. The method of claim 9, wherein the first detected object, the second detected object, and the portions of the third detected object are combined to determine a first object label and the first object label and context data is input to the partially observable Markov decision process.

11. The method of claim 9, wherein the second neural network includes a decoder and a generator and is trained using a discriminator.

12. The method of claim 9, wherein the partially observable Markov decision process includes states, actions, and transitions, wherein inputting the first detected object, the second detected object, the portions of the third detected object, and the context data causes one or more transitions from a first state to a second state.

13. The method of claim 12, wherein the partially observable Markov decision process includes a learning process which includes previous states, actions, and transitions.

14. The method of claim 13, wherein the high confidence detected object output by the partially observable Markov decision process is based on previous decisions.

15. The method of claim 9, wherein the context data includes one or more of sensor data, map data and speed and direction of an object in an environment around a vehicle.

16. The method of claim 9, wherein the vehicle path is used to operate a vehicle.

\* \* \* \* \*